3,213,034
PROCESS FOR THE PRODUCTION OF AlCl₃–H₃PO₄ CATALYST
Lewis E. Drehman, Bartlesville, Okla., assignor to Phillips Petroleum Company, a corporation of Delaware
No Drawing. Filed Apr. 3, 1961, Ser. No. 99,992
4 Claims. (Cl. 252—435)

This invention relates to an improved aluminum chloride-phosphoric acid isomerization catalyst and to the processes of preparing and using said catalyst.

Alkylation processes are widely employed in the preparation of high-grade motor fuels. A constant and continuing supply of isoparaffins, necessary to the alkylation processes, is needed. A widely used process for the preparation of isoparaffins comprises the isomerization of normal paraffins.

A catalyst widely used in promoting the formation of more-highly branched hydrocarbons from less-highly branched hydrocarbons is prepared by interacting a phosphoric acid with aluminum chloride. As this catalyst and other catalysts have been employed with limited effectiveness in isomerization reactions, it is desired to provide an isomerization catalyst having improved activity.

Accordingly, an object of this invention is to provide an improved aluminum chloride-phosphoric acid isomerization catalyst and a process of preparing said catalyst.

Another object of this invention is to provide an isomerization process employing an improved aluminum chloride-phosphoric acid isomerziation catalyst.

Other objects, advantages and features of my invention will be readily apparent to those skilled in the art from the following description and the appended claims.

Broadly, I have discovered that the isomerization activity of a supported aluminum-chloride phosphoric acid catalyst is substantially improved by the inclusion of an elevated temperature treatment with anhydrous hydrogen chloride while preparing the catalyst.

The inventive aluminum-chloride phosphoric acid catalyst is prepared by impregnating an active, porous oxide support of high surface area with aqueous phosphoric acid, drying the impregnated support, and subsequently subliming aluminum chloride onto the support. A hydrogen chloride treatment step is applied either to the support before impregnation or after impregnation with phosphoric acid, with the former preferred. A support material utilized in the preparation of the inventive catalyst is selected from the group of high surface area solid oxide supports often called gels, and active natural and synthetic clays. Examples of these support materials, well known in the catalyst art, are bauxite, silica-alumina, active alumina, etc.

The support material is contacted with 0.2 to 5 molar aqueous phosphoric acid by a conventional contacting means. Orthophosphoric acid is a preferred acid in the preparation of the inventive catalyst, but pyrophosphoric acid and metaphosphoric acid can be employed. These acids differ essentially in the state of hydration; and, if sufficient water is present, aqueous solutions of pyrophosphoric acid and metaphosphoric acid will hydrate further to form orthoposphoric acid. The amount of phosphoric acid with which the support is impregnated ranges from about 0.3 to about 3 molecular weights for each mol of aluminum chloride to be incorporated in the catalyst.

The impregnated support material is dried by a conventional drying step such as, for example, heating the impregnated support material to a temperature within the range of 350–1000° F. in the presence of nitrogen or other drying gas. Other methods of drying the impregnated support material can, of course, be employed.

The hydrogen chloride treatment is employed as an additional step in the preparation of the catalyst in order to produce a more active catalyst. As previously noted, the hydrogen chloride treatment can be applied to the support material either before or after impregnation with the desired amount of phosphoric acid. It is preferred that the hydrogen chloride treatment step be employed before impregnation of the support material with the phosphoric acid. In either case, the support material should be dried before treating with hydrogen chloride for best results. The drying step can be accomplished while treating the support material with hydrogen chloride; but a longer treating period is required to obtain equivalent results of treatment of the support material and separation of water from the support material.

Anhydrous hydrogen chloride treatment is carried out at temperatures in the range of 400–1200° F., preferably 500–1100° F. The length of the treating period is in the range of 0.1–20 hours, preferably 1–10 hours. Atmospheric pressures are normally employed, although an elevated pressure can be utilized when desirable to enhance the operation of the process apparatus. The hydrogen chloride treatment step can be conducted in a static system, but a flow system is preferred.

Following the hydrogen chloride treatment and phosphoric acid impregnation steps, aluminum chloride is sublimed onto the support material. Various methods of subliming the aluminum chloride onto the support material can be employed. For example, anhydrous natural gas or nitrogen can be employed as a carrier gas to contact the support material with the vaporous aluminum chloride. An impregnation with sublimed aluminum chloride at a temperature in the range of 325–550° F. is normally employed, although lower and higher temperatures can be utilized. The aluminum chloride incorporated into the catalyst is in the range of 2–15 percent by weight of the support material.

The inventive catalyst is particularly applicable in the isomerization of isomerizable saturated hydrocarbons, including acyclic paraffins and naphthenes. The inventive catalyst is particularly suitable for the isomerization of straight chain paraffins containing four or more carbon atoms per molecule including n-butane, n-pentane, n-heptane and the like. Some examples of naphthenes which can be isomerized with the inventive catalyst are methylcyclopentane, dimethylcyclopentane, cyclohexane, methylcyclohexane and the like. The inventive catalyst can be employed for the isomerization of mixtures of paraffins and naphthenes such as are obtained from the distillation of straight run or natural gasoline.

Utilizing the catalyst of this invention in the isomerization of the foregoing hydrocarbons, a hydrocarbon to be isomerized is contacted with the inventive catalyst and a temperature in the range of 125–350° F., preferably 150–300° F. Although not necessary to the isomerization reaction, the hydrocarbon to be isomerized can be contacted with the inventive catalyst in the presence of hydrogen. The use of hydrogen to control possible side reactions in an isomerization process is well known in the art. The hydrocarbon to be isomerized is passed to the isomerization zone containing the inventive catalyst at a rate so as to maintain a liquid hourly space velocity of from 0.1 to 10, preferably 0.5–5. Although normally the isomerization zone will be operated so as to maintain the hydrocarbon within said isomerization zone in a liquid state, it is not intended that the invention be limited thereto. Pressure in the isomerization zone will be in the range of 100–1000 p.s.i.g.

Aluminum chloride can be passed to the isomerization zone in sufficient quantities to maintain the activity of the inventive catalyst. The refortification of isomerization catalyst by the addition of aluminum chloride to the isomerization zone is well known in the art. It is within the scope of this invention to employ isomerization promotors such as hydrogen chloride, introduced with the hydrocarbon feed to the isomerization zone for example. A quantity of hydrogen chloride in the range of 1–10 volume percent of the isomerization zone feed is generally employed.

In utilizing the inventive catalyst for the isomerization of hydrocarbons, the isomerization can be carried out either batchwise or continuous, preferably the latter. The catalyst can be employed in a fixed or moving bed.

The following examples are presented to illustrate the advantages of the previously described inventive catalyst but it is not intended that the invention be unduly limited to the embodiment shown therein.

EXAMPLE I

A support material comprised of bauxite was dried at a temperature in the range of 1050–1100° F. for 4.5 hours. The dried bauxite support material was subjected to a hydrogen chloride treatment for a period of four hours at atmospheric pressure by causing the hydrogen chloride to continuously flow through the catalyst support bed. The treating temperature was maintained in the range of 1050–1100° F. The treated support material was then impregnated with a 2 molar aqueous phosphoric acid so that the phosphoric acid impregnated support material contained 8.3 percent $H_3PO_4$ based on the weight of the bauxite. The treated and impregnated bauxite was then subjected to a second drying step for a period of 2.5 hours. The second drying step was conducted at a temperature in the range of 400–475° F. The final catalyst preparation step consisted of subliming aluminum chloride onto the treated and impregnated bauxite. The sublimation step was conducted at a temperature in the range of 430–450° F. for a period of four hours. The weight of the catalyst increased 6.8 percent due to the sublimation of aluminum chloride.

The effectiveness of the inventive hydrogen chloride treated catalyst was determined by passing n-butane to an isomerization zone containing the above catalyst. The butane was charged to the isomerization zone at a space velocity of 0.7 liquid volume per hour. The feed to the isomerization zone also contained 0.2 pound of aluminum chloride per barrel of hydrocarbon feed and 5–7 mol percent of hydrogen chloride. The temperature of the isomerization zone was maintained at 180° F. The results are as noted in Table I.

EXAMPLE II

The same support material as in Example I was impregnated with a 2 molar aqueous phosphoric acid solution so that the impregnated support material contained 7.6 percent $H_3PO_4$ based on the weight of the bauxite support material. The impregnated support material was then dried for a period of 2.5 hours, with a drying temperature in the range of 800–960° F. The impregnated and dried bauxite support material was then subjected to a hydrogen chloride treating step for a period of four hours by causing the hydrogen chloride to continuously flow through the impregnated catalyst support bed. The temperature of the hydrogen chloride treating zone was maintained in the range of 930–960° F. The final catalyst preparation step consisted of subliming aluminum chloride onto the treated and impregnated bauxite. A sublimation temperature within the range of 430–480° F. was maintained for a period of three hours. The weight of the catalyst increased 3.1 percent due to the sublimation of aluminum chloride.

The effectiveness of the prepared catalyst was determined as in Example I. The same isomerization conditions of feed, rates of flow and temperature were maintained. The results are noted in Table I.

EXAMPLE III

In order to compare the hydrogen chloride treated catalyst of Eaxmples I and II with a conventionally prepared aluminum chloride-phosphoric acid catalyst, the following run was made. The same bauxite support material as employed in Examples I and II was impregnated with a 2 molar aqueous phosphoric acid solution so that the impregnated bauxite contained 5.4 percent $H_3PO_4$ based upon the weight of the bauxite support material. The impregnated bauxite was then dried at a temperature within the range of 800–925° F. for a period of 4.25 hours. Aluminum chloride was sublimed upon the impregnated bauxite at a sublimation temperature in the range of 475–510° F. for a sublimation period of four hours. The prepared catalyst showed a 6.0 weight percent gain due to the sublimation step.

The effectiveness of the prepared catalyst was determined as in the case of Examples I and II. The same isomerization conditions were maintained as in Examples I and II. The results are as shown in Table I.

The term "sublimation step" employed in Example I refers to the process step of contacting the support material with aluminum chloride vapors. The term "sublimation temperature" employed in Examples II and III refers to the temperature at which the aluminum chloride vapors and support are contacted. The sublimation step of Examples I, II and III was accomplished by heating a mixture of the aluminum chloride and support material together and passing a stream of nitrogen through the mixture.

*Table I*

| Example | Isomerization Activity | |
|---|---|---|
| | Conversion (Percent) | Selectivity (Percent) |
| I | 50.5 | 98.3 |
| II | 47.5 | 97.5 |
| III | 40.6 | 97.7 |

When comparing the results obtained in Examples I and II with the results obtained in Example III, it is noted that the isomerization activity, as measured by the percent n-butane converted or isomerized, of the hydrogen chloride treated catalyst of Examples I and II is substantially increased. A comparison of the catalyst preparation conditions of Examples I, II, and III conclusively illustrate that the increased isomerization activity is due to the hydrogen chloride treating step. It is also noted that an increased isomerization activity is obtained when the hydrogen chloride treating step precedes the impregnation of the support material with the phosphoric acid.

As will be evident to those skilled in the art, various modifications of this invention can be made, or followed, in the light of the foregoing disclosure and discussion without departing from the spirit or scope thereof.

I claim:

1. In a process for the production of a catalyst which comprises impregating an active porous oxide support material with phosphoric acid, drying the impregnated support material, and subliming aluminum chloride onto said impregnated support material; the improvement which comprises contacting the support material with anhydrous hydrogen chloride at a temeprature in the range of 400–1200° F. for a period of time from 0.1–20 hours and prior to subliming aluminum chloride onto said support material.

2. The process of claim 1 wherein said support material is contacted with hydrogen chloride prior to impregnating said support material with phosphoric acid.

3. The process of claim 1 wherein said support material is contacted with hydrogen chloride after said support material has been impregnated with phosphoric acid.

4. A process for the production of an isomerization catalyst which comprises contacting anhydrous bauxite support material with anhydrous hydrogen chloride in a contact zone for a period of time in the range of 0.1–20 hours, maintaining the temperature of said contact zone in the range of 400–1200° F., impregnating said bauxite with an aqueous phosphoric acid in an amount ranging from about 0.3 to 3 molecular weights of phosphoric acid for each mol of hereinafter described aluminum chloride incorporated into said catalyst, drying said impregnated bauxite, and subliming aluminum chloride onto said bauxite so as to incorporate aluminum chloride into said bauxite in the range of 2–15 percent by weight of said bauxite.

References Cited by the Examiner

UNITED STATES PATENTS

| | | | |
|---|---|---|---|
| 2,402,051 | 6/46 | Ipatieff et al. | 252—435 |
| 2,596,497 | 5/52 | Mavity | 252—435 X |
| 2,646,452 | 7/53 | Schmerling | 252—435 X |
| 2,926,131 | 2/60 | Hepp et al. | 252—441 X |
| 2,938,874 | 5/60 | Rosinski | 252—437 |
| 2,965,694 | 12/60 | Stanley et al. | 260—683.67 |
| 2,967,156 | 1/61 | Talvenheimo | 252—437 |
| 3,005,035 | 10/61 | Kimberlin et al. | 260—683.67 |

MAURICE A. BRINDISI, *Primary Examiner.*

JULIUS GREENWALD, *Examiner.*